(12) United States Patent
Newton et al.

(10) Patent No.: US 11,388,215 B2
(45) Date of Patent: *Jul. 12, 2022

(54) MULTILAYER AND SYNCHRONIZED COMMUNAL SOCIAL MEDIA SYSTEM AND METHOD

(71) Applicant: Groopview, Inc, Philadelphia, PA (US)

(72) Inventors: Delmond Newton, Philadelphia, PA (US); Krishnan Rajam, Germantown, MD (US)

(73) Assignee: Groopview, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,404

(22) Filed: Nov. 18, 2020

(65) Prior Publication Data

US 2021/0075840 A1    Mar. 11, 2021

Related U.S. Application Data

(63) Continuation-in-part of application No. 16/872,704, filed on May 12, 2020.
(Continued)

(51) Int. Cl.
| | |
|---|---|
| *H04L 29/06* | (2006.01) |
| *G06Q 50/00* | (2012.01) |
| *H04L 9/32* | (2006.01) |
| *H04L 65/75* | (2022.01) |
| *H04L 65/4053* | (2022.01) |
| *H04L 65/611* | (2022.01) |

(52) U.S. Cl.
CPC .......... *H04L 65/762* (2022.05); *G06Q 50/01* (2013.01); *H04L 9/3226* (2013.01); *H04L 9/3297* (2013.01); *H04L 65/4053* (2013.01); *H04L 65/611* (2022.05)

(58) Field of Classification Search
CPC ..... G06Q 50/01; H04L 9/3226; H04L 9/3297; H04L 65/602; H04L 65/605; H04L 65/4053; H04L 65/4076; H04L 2463/101; H04W 12/033
See application file for complete search history.

(56) References Cited

U.S. PATENT DOCUMENTS

| | | | |
|---|---|---|---|
| 2015/0271546 A1* | 9/2015 | Kim ................... | H04N 21/4307 725/109 |
| 2018/0007091 A1* | 1/2018 | Rajapakse ............. | H04L 12/189 |

(Continued)

*Primary Examiner* — Kostas J Katsikis

(74) *Attorney, Agent, or Firm* — Neal Blibo, LLC; Arlene P. Neal

(57) ABSTRACT

A communal media system includes a content management system for storing multimedia content and a synchronization system configured to: retrieve the multimedia content for delivery to a plurality of user devices and receive social media content generated by the user devices; separate the multimedia content and the social media content into a set of prioritized layers; determine a timestamp offset for each of the user devices; and adjust simultaneous deliveries of the multimedia content and the social media content to the user devices, based on a priority associated each layer and the timestamp offset associated with each user device, The multimedia content is delivered to each user devices at the same time and the social media content is delivered to the user devices at the same time while the multimedia content is being viewed on the user devices.

20 Claims, 9 Drawing Sheets

Related U.S. Application Data

(60) Provisional application No. 62/825,212, filed on Mar. 28, 2019.

(56) References Cited

U.S. PATENT DOCUMENTS

| | | | |
|---|---|---|---|
| 2018/0255114 A1* | 9/2018 | Dharmaji | H04L 65/403 |
| 2020/0128060 A1* | 4/2020 | Han | H04L 65/61 |

\* cited by examiner

MULTILAYER AND SYNCHRONIZED COMMUNAL SOCIAL MEDIA SYSTEM AND METHOD

CROSS REFERENCE TO RELATED APPLICATION

The present application is a continuation-in-part of U.S. Provisional application Ser. No. 16/872,704 titled "A Communal Social Media System and Method," filed May 12, 2020, which claims the benefit of U.S. Provisional Application Ser. No. 62/925,212 titled "Method For Viewing Online Content," filed Oct. 23, 2019, which claims the benefit of U.S. Provisional Application Ser. No. 62/749,298 titled "Method For Viewing Online Content," filed Oct. 23, 2018, all of which are incorporated by reference herein in their entirety.

BACKGROUND OF THE INVENTION

Connective features on internet browsers such as Google Chrome and social media platforms, such as Facebook, Twitter and Instagram, have transformed how individuals connected through these platforms may simultaneously participate in an event, even when these individuals are physically located in different locations. For example, individuals in different locations that are connected via Facebook may view an event such as a concert, movie, or sports match, stream a video, play a video game or attend an education session at the same time, while also being able to communicate, for example via text, with each other over the social media platform. Similarly, individuals in different locations may watch the same movie using, for example, a Chrome teleparty extension, while also being able to communicate, for example via text, during the movie. However, interactions over these platforms are typically not fully synchronized due to the differences in the network configurations of the individuals participating in a social media session. For example, when multiple individuals are simultaneously viewing a video on a platform, there are likely to be different lag times on when the video is received on each user's device due to the differences in, for example, the bandwidth of each user's network.

Moreover, interactions over these platforms are typically fragmented, wherein some platforms may provide one or more of video streaming, video sharing, group video chat and group text as discrete features. Thus, there is a need for an improved system and method of providing multilayer and synchronized social media features on a single platform.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
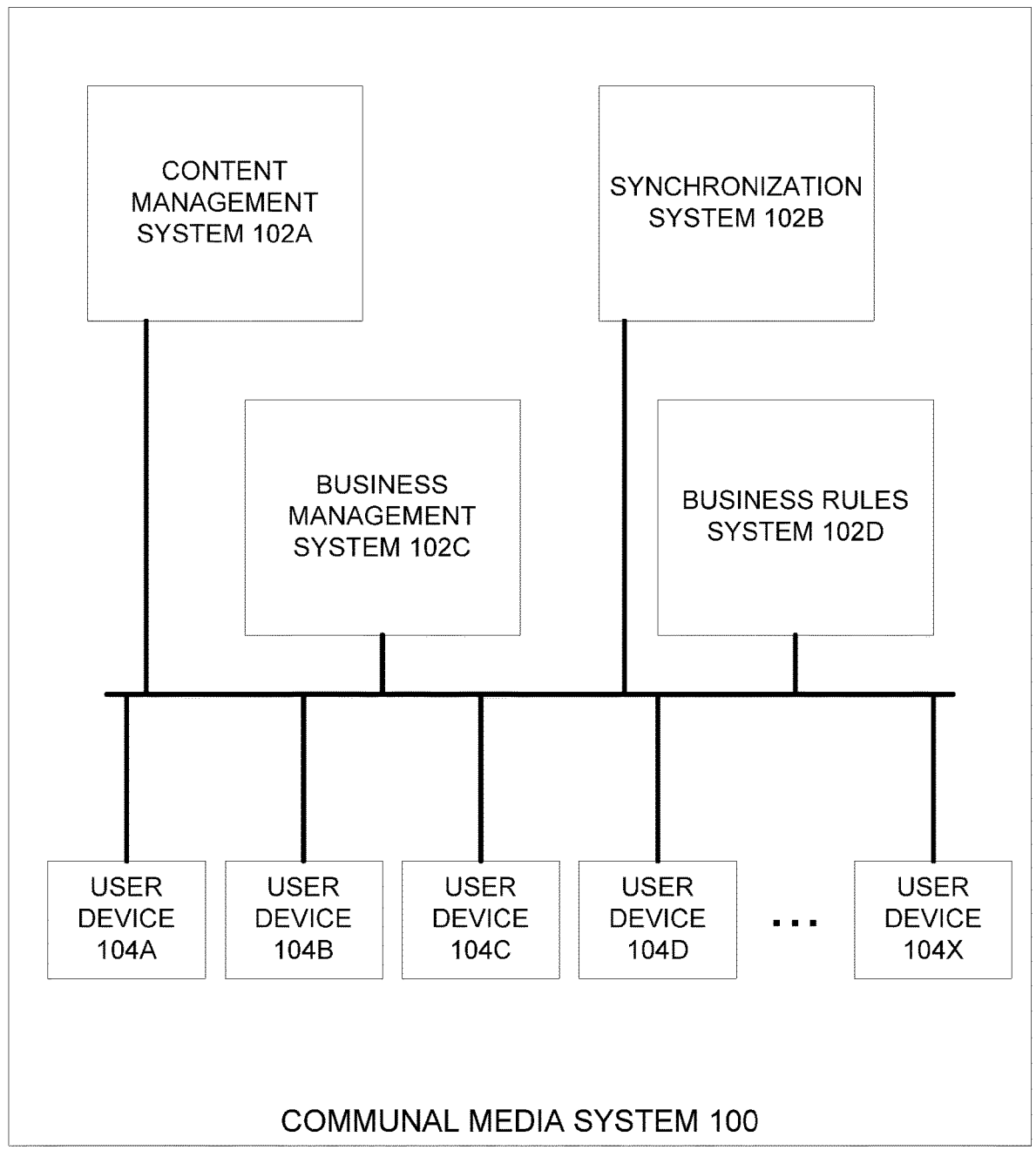
FIG. 1 is a block diagram of a communal media system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to a communal media system including a content management system configured to store multimedia content. The communal media system also includes a synchronization system configured to retrieve the multimedia content for delivery to a plurality of user devices, and receive social media content generated by the plurality of user devices, and separate the multimedia content and the social media content into a set of prioritized layers. The synchronization system is also configured to transmit the multimedia content and the social media content to the plurality of user devices; continuously receive at least one of timestamp receipts and fragment identifier acknowledgements associated with receipt of the multimedia content from the plurality of user devices; and adjust simultaneous deliveries of the multimedia content and the social media content to the plurality of user devices, based on a priority associated with each layer and at least one of the timestamp receipts and the fragment identifier acknowledgements received from each of the plurality of user devices. The multimedia content and the social media content are delivered to each of the plurality of user devices at a same time, without any noticeable lag time during receipt of the multimedia content and the social media content by the plurality of user devices.

Some embodiments are directed to a method for delivering multimedia content during a communal media session. The method includes registering a plurality of user devices to participate in the communal media session. The method includes, at a communal media system, registering a plurality of user devices to participate in the communal media session. The method further includes, during the communal media session, retrieving, by a synchronization system, the multimedia content to be delivered to the plurality of user devices and receiving social media content generated by at least one of the plurality of user devices; separating, by the synchronization system, the multimedia content and the social media content into a set of prioritized layers; transmitting, by the synchronization system, the multimedia content and the social media content to the plurality of user devices; continuously receiving, by the synchronization system, at least one of timestamp receipts and fragment identifier acknowledgements associated with receipt of the multimedia content from the plurality of user devices; and adjusting, by the synchronization system, simultaneous deliveries of the multimedia content and the social media content to the plurality of user devices, based on a priority with associated each layer and at least one of the timestamp receipts and the fragment identifier acknowledgements received from each of the plurality of user devices. The multimedia content and the social media content are delivered to each of the plurality of user devices at a same time without any noticeable lag time during receipt of the multimedia content and the social media content by the plurality of user devices;

Other embodiments are directed to a method for sharing multimedia content generated on a host user device in a communal media session. The method includes registering, at a communal media system, a plurality of user devices to participate in the communal media session. During the communal media session the method further includes: retrieving, by a synchronization system, a recording from the host user device, the host user device being one of a plurality of user devices in the communal media session, wherein the recording includes multimedia content to be delivered to other user devices; receiving, by the synchronization system, social media content generated by at least one of the plurality of user devices; separating, by the synchronization system, the multimedia content and the social media content into a set of prioritized layers; transmitting, by the synchronization system, the multimedia content to the other user devices based on a timestamp offset associated with the host user device and transmitting the social media content among the plurality of user devices; continuously receiving, by the synchronization system, at least one of timestamp receipts and fragment identifier acknowledgements associated with receipt of the multimedia content from the other user devices; adjusting, by the synchronization system, simultaneous deliveries of the multimedia content and the social media content to the plurality of user devices, based on a priority associated each layer and at least one of the timestamp receipts and the fragment identifier acknowledgements, wherein the multimedia content and the social media content are delivered to each of the plurality of user devices at a same time without any noticeable lag time during receipt of the multimedia content and the social media content by the plurality of user devices.

FIG. 1 is a block diagram of a communal media system used in accordance with some embodiments. Communal media system 100 is configured to include one or more systems 102 (shown as, for example, a content management system 102a, a synchronization system 102b, a business management system 102c and a business rules system 102d), each of which may be located in the same physical location as components on a single computing device or on different computing devices that are communicatively coupled. Systems 102 may also be in remote locations on different computing devices that are communicatively coupled. Systems 102 may include additional components (not shown for the sake of simplicity) that may be used to transmit information across communal media system 100.

Content management system 102a may include multimedia content such as live or recorded videos. Synchronization system 102b is configured to synchronize delivery of information to communicatively coupled user devices such that the user devices in a communal session can receive the information at the same time. Business management system 102c is configured to perform, for example, user authorization and authentication, device registrations, entitlement checks, and/or optional digital rights management (DRM) content encryption for licensed content stored on content management system 102a. Business rules system 102d is configured to confirm access to and/or offer subscriptions for access to the multimedia content stored on content management system 102a.

Communal media system 100 is also configured to include multiple user devices 104 (shown as, for example, user devices 104a-104x) that are communicatively coupled to each other and to systems 102. User devices 104 may be mobile devices including mobile phones or tablets, personal computers, gaming devices or other computing devices that can be used for viewing multimedia content and interacting over social media. Each user device 104 may be independently configured. For example, user device 104a may be configured to operate on the iOS platform and on a 5G network having a first set of specifications and user device 104b may be configured to operate on the Android platform on a 5G network having a second set of specifications, where the first and second specifications may be different. Despite the differences in the configurations of user devices 104, synchronization system 102b is configured to synchronize simultaneous delivery of multimedia and other social media content to user devices 104 such that each user device 104 receives the delivered content at the same time.

At an initial period, each user device 104a-104x is configured to download and install an application including communal media system 100 from, for example, a mobile app store or the Internet. After installing communal media system 100 on each user device 104, business management system 102c is configured to capture system configuration information from the user device and determine if the configuration on the user device meets a predetermined threshold. For example, business management system 102c may determine if the bandwidth available for each user device 104 is above a predetermined minimum bandwidth threshold. If business management system 102c determines that the bandwidth for a user device is below the predetermined minimum bandwidth threshold, business management system 102c may determine that the device with bandwidth below the minimum bandwidth threshold cannot be supported and will prevent the device from participating in future communal media sessions. If business management system 102c determines that the bandwidth of a user device 104 is at or above the predetermined threshold, business management system 102c may capture the user login credentials, such as user ID or social media login, from the user device in order to allow the user of that device to participate in future communal media sessions.

Consider, for example, that business management system 102c is configured evaluate the network configuration of each user device 104a-104x and determine the minimum network bandwidth required for simultaneous transmission over communal media system 100 to user devices 104-104x. If business management system 102c determines that user device 104a has a bandwidth of 100 Mbps, user device 104b has a bandwidth of 75 Mbps, user device 104c has a bandwidth of 100 Mbps, user device 104d has a bandwidth of 25 Mbps, and so on, with 25 Mbps being the slowest network bandwidth, business management system 102c may determine the minimum network bandwidth required for simultaneous transmissions to user devices 104-104x. If business management system 102c determines that the minimum required network bandwidth is below 25 Mbps, business management system 102c may capture the user login credentials from user devices 104-104x in order to allow the users of those devices to participate in future communal media sessions.

In some embodiments, business management system 102c is configured to capture system configuration information from a user device and determine if the configuration on the user device meets a predetermined threshold when the user devices registers to participate in a specific session.

Consider an example where users of devices 104a-104d use those devices to register for a session on communal media system 100. Users of devices 104a-104d may register through a user interface on communal media system 100 and may browse media available on content management system 102a via the user interface. A user of one of devices 104a-104d (referred to herein as a host, i.e., the device used to initiate the session and/or used to select media content that is to be shared with the other devices in a session), for example, device 104a, may select a specific media. The media selected by device 104a may be shared/viewed on devices 104b-104d in a communal setting at an appointed time on communal media system 100. The user of device 104a may send invitations to devices 104b-104d for the users of devices 104a-104d to view the selected content at the appointed time. Each of the users of devices 104b-104d may accept or reject the invitation. At the appointed time, user devices 104a-104d may be connected via communal media system 100 for the communal viewing session of the content selected via device 104a.

In an embodiment, business management system 102c may obtain the configuration information from user devices 104a-104d when the user devices register to participate in a specific session. For example, business management system 102c may obtain the location, the network carrier, and/or the network type (for example, WiFi, LTE, 5G) of the carrier of each user device 104a-104d. Business management system 102c may also test the speed of each user device 104a-104d and store the information for each user device 104a-104d along with a timestamp.

If the selected information is licensed content, the user of each device 104a-104d may enter subscription information into the associated device 104a-104d, wherein each device may transmit the subscription information to business rules system 102d. Using the received subscription information, business rules system 102d may obtain confirmation for access to the licensed content from a content owner or distributor. When necessary, business rules system 102d may provide access to subscriptions to one or more user devices 104a-104d and is configured to receive payments for the subscription from one or more user devices 104a-104d. Once the confirmation from the content owner or distributor for the user each device 104a-104d is obtained, business management system 102c may obtain decryption keys for the content from a DRM system. Communal media system 100 may then present the decrypted information to user devices 104a-104d for communal viewing.

During the session, synchronization system 102b is configured to synchronize the simultaneous delivery of multimedia content, stored on content management system 102a, to user devices 104a-104d, such that each user device 104a-104d receives the delivered content at the same time with no noticeable delivery lag, as though each user is receiving the information on the same device. Synchronization system 102b is also configured to synchronize the simultaneous delivery of live videos captured from forward and/or rear cameras on one or more user device 104a-104d. The synchronized delivery is sent to those devices 104a-104d not creating the videos, such that each user device 104a-104d receives the delivered video at the same time it is being recorded with no noticeable delivery lag. Synchronization system 102b is further configured to simultaneously transmit video chats, texts, emotive responses, and other social media features generated on user devices 104a-104d while the users of those devices are viewing the delivered multimedia content.

In an embodiment, a user associated with a device 104a-104d may create a profile photo of the user, record an image of the user, or create an avatar that is configured to represent an image of the user, wherein the avatar may mimic the user's actions, including speaking and other actions performed by the user. The avatar or other images of users associated with devices 104a-104d, video chats, texts, emotive responses, and other social media features generated on devices 104a-104d may be overlaid on the delivered multimedia content. This enables the users of devices 104a-104d to view the multimedia content and social media interactions at the same time, without any noticeable lag time associated with receipt of the multimedia and social media content at user devices 104a-104d. Other content such as targeted advertisement and recommendations based on previous usage on one or more user device 104a-104d may also be overlaid on the delivered multimedia content.

In an embodiment, the host may pause, rewind, or fast forward the multimedia content, wherein synchronization system 102b is also configured to ensure that the pause, rewind, or fast forward action is synchronized across all user devices.

In an embodiment, the host may make the communal session live to the public by activating a live button on the user interface. Once the session is live, users of other devices, for example, devices 104e-104x that are accessing communal media system 100 may view and participate in the session by sending texts, emotive responses, and other social media features generated on those uses devices 104e-104x. The live session may have a ticker counter to identify how may users are participating in the live session.

In some embodiments, a thumbnail image of the selected content may be provided in communal media system 100. Users of devices 104a-104d may manipulate the thumbnail images by, for example, moving, resizing, or deleting the image on the user interface.

Figure 2:
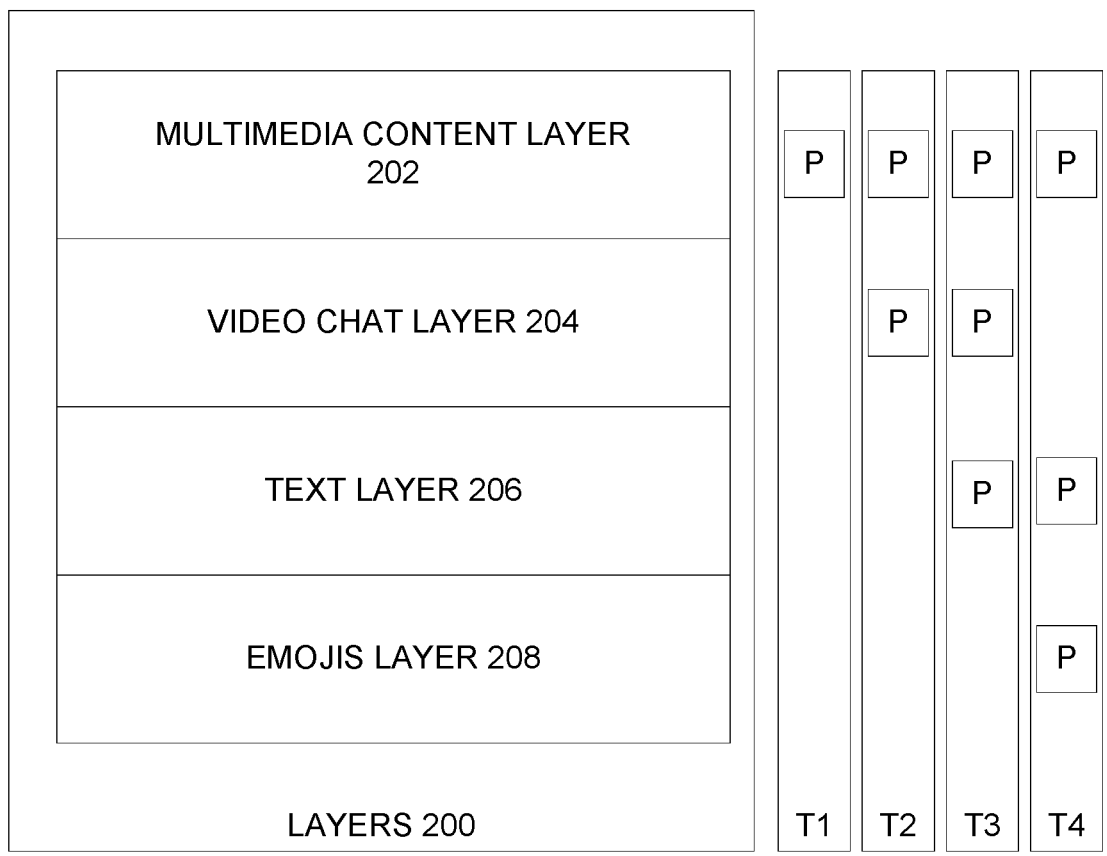
FIG. 2 is a block diagram of how packets are structured and delivered in the communal media system in accordance with some embodiments.

FIG. 2 is a block diagram of how packets are structured and delivered in the communal media system 100 in accordance with some embodiments. Synchronization system 102b is configured to separate content transmitted over communal media system 100 into multiple layers 200 and to synchronize delivery of the multiple layers to user devices 104a-104d, i.e., those user devices registered to participate in the session on communal media system 100. For example, synchronization system 102b may configure the multimedia content stored on content management system 102a in a multimedia content layer 202, video chats received from user devices 104a-104d in a video chat layer 204, texts received from user devices 104a-104d in a text layer 206, and emojis received from user devices 104a-104d in an emojis layer 204. It should be apparent that synchronization system 102b may separate content transmitted over communal media system 100 into more or fewer layers than layers 202-208.

After separating the content into layers 200, synchronization system 102b may prioritize delivery of packets. For example, packets in multimedia content layer 202 may have a first priority, packets in video chat layer 204 may have a second priority, packets in text layer 206 may have a third priority, and packets in emojis layer 204 may have a fourth priority. Synchronization system 102b is also configured to synchronize voice and video packets in video streams in multimedia content layer 202 and voice and video packets in video chat layer 204 so that there is no lag time between the voice and the video packets in each layer. As such, synchronization system 102b is configured to synchronize delivery of packets in the same layer and delivery of multiple layers of content across disparate devices and disparate access networks so that all user devices 104a-104d may receive content delivered over communal media system 100 at the same time.

Consider, for example, that synchronization system 102b has packets (P) in different layers that are to be delivered at times T1-T4, as shown in FIG. 2. At T1, the packets in multimedia content layer 202 are delivered first. At T2, the packets in multimedia content layer 202 are delivered before the packets in video chat layer 204. At T3, the packets in multimedia content layer 202 are delivered first, the packets in video chat layer 204 are delivered second, and the packets in text layer 206 are delivered last. At T4, the packets in multimedia content layer 202 are delivered first, the packets in text layer 206 are delivered second, and the packets in emoji layer 208 are delivered last.

Figure 3:
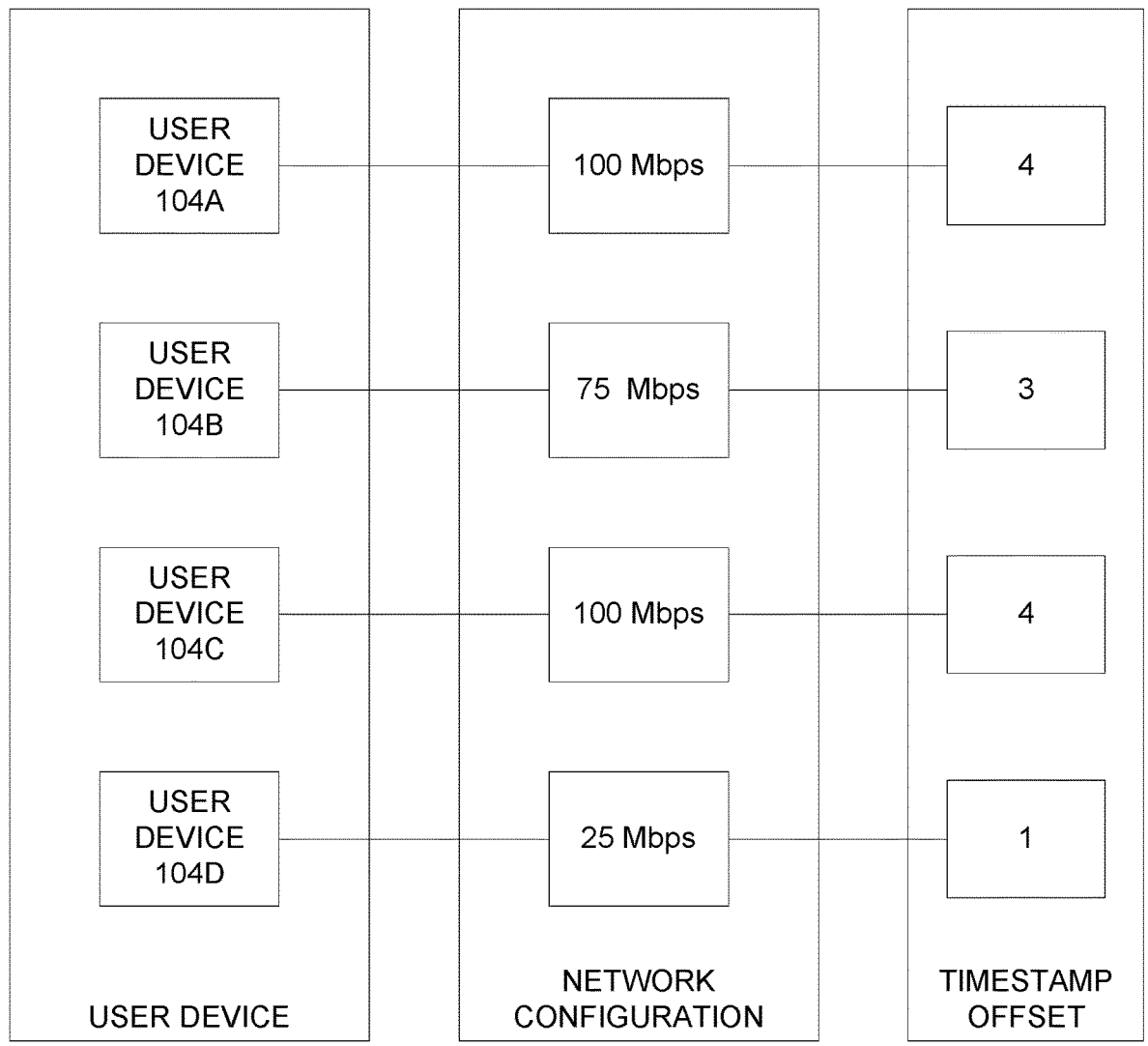
FIG. 3 is a block diagram of a timestamp structure used in accordance with some embodiments.

FIG. 3 is a block diagram of a timestamp structure used in accordance with some embodiments. When content is being transmitted over communal media system 100, at pre-determined time intervals during the session, synchronization system 102b is configured to continuously receive timestamp receipts from each user device 104a-104d. The timestamp receipts include timestamps of when a predefined number of packets is received by a user device. and timestamps of when a predefined number of packets is sent from the device. The interval for delivering and/or receiving timestamp receipts may be static or dynamic Static delivery may involve delivering and/or receiving timestamp receipts at predefined intervals (e.g. every 100 mms) and dynamic delivery may involve adapting delivery and/or receipt of timestamp receipts according to the various speeds of the heterogenous networks of user devices 104a-104d.

Synchronization system 102b may determine a timestamp offset for each user device 104a-104d and for each type/layer of content (video stream, video chat, text and emojis) delivered. In some embodiments, the timestamp offset may be based on a predetermined minimum network configuration and/or the timestamp receipts, wherein synchronization system 102b may adjust packet deliveries to correspond with the timestamp offset of each user device 104a-104d. Continuing with the example where user device 104a has a bandwidth of 100 Mbps, user device 104a has a bandwidth of 75 Mbps, user device 104a has a bandwidth of 100 Mbps, and user device 104a has a bandwidth of 25 Mbps, synchronization system 102b may set the timestamp offset for user devices 104a-104d based on the lowest bandwidth, as shown in FIG. 3. Accordingly, the timestamp offsets for user device 104a and 104c are set to four times the timestamp offset of user device 104d and the timestamp offset for user device 104b is set to three times the timestamp offset of user device 104d, This ensures that when packets are delivered using the timestamp offsets, synchronization system 102b can normalize the delivery of packets to all user devices 104a-104d (i.e., take care of propagation delays or speed up delivery based on the bandwidth). In this manner, all user devices 104a-104d will receive multimedia and social media contents at the same time and without any noticeable delay in receipt of the content among the devices, ensuring that users of devices 104a-104d are viewing and interacting with the content as if they were in the same physical location and viewing the content on the same device.

In addition to sending and receiving timestamp receipts to and from devices 104a-104d, synchronization system 102b may also send and/or receive information associated with frame and/or fragment of the multimedia content to devices 104a-104d. Continuing with the example above, before the viewing session begins, host user device 104a may request, from content management system 102a, a location of a manifest file including multimedia content for a viewing session. Content management system 102a may provide information including, for example, a Uniform Resource Locator (URL) and/or the name of the manifest file. Media fragments of, for example, three to six seconds of the multimedia content, may be stored in the manifest file. Based on resolution, each second of the media fragment may include, for example, twenty-four-sixty frames of full motion video and each frame may include a unique frame identifier. Before the communal session, host device 104a may send the URL for the manifest file to user devices 104b-104d participating in the communal session.

In addition to and/or in lieu of timestamp receipts transmitted to and from devices 104a-104d, synchronization system 102b may use the frame identifiers in the media fragments transmitted to and from devices 104a-104d to synchronize delivery of the media to devices 104a-104d. Consider, for example, that during the viewing session synchronization system 102b is to transmit a fragment with twenty-four frames, with each successive frame assigned an identifier from 1-24. Also consider that at time T1, synchronization system 102b is to transmit frames 1-10 to devices 104a-104d, and at time T2, synchronization system 102b is to transmit frames 11-20 to devices 104a-104d. Between T1 and T2 synchronization system 102b may receive frame identifier acknowledgements of the receipts of frames 1-10 from devices 104a-104d. If synchronization system 102b receives a frame identifier acknowledgement of the receipt of frames 1-10 from devices 104a-104b, and a frame identifier acknowledgement of the receipt of frames 1-7 from device 104c, and a frame identifier acknowledgement of the receipt of frames 1-8 from devices 104d, at T2, rather than send frames 8-10 to device 104c and frames 9 and 10 to device 104d, synchronization system 102b may transmit frames 11-20 to devices 104a-104d, thereby synchronizing delivery of the frames to devices 104a-104b with delivery of the frames to devices 104c-104d.

In addition to performing configurations tests, including a speed test, on each user device 104a-104d to determine that the configuration of user device meets the minimum network threshold at the start of a session, business management system 102c may perform periodic speed tests (for example, on an as needed basis or at predefined intervals) on each user device 104a-104d and may send the results to synchronization system 102b.

At the start of the communal session, host device 104a may start to play the media fragments stored in the manifest file in an order determined, for example, by information obtained from the manifest file. At the start of the communal session, host device 104a may record a timestamp receipt for the start time, for example, in milliseconds or seconds, and may send the timestamp receipt and the frame number of the media fragment being played to synchronization system 102b. As the media is played, host device 104a may continuously send timestamp receipts and frame identifier acknowledgments of media fragment being played to synchronization system 102b. Synchronization system 102b may record the frame identifier acknowledgments, timestamp receipts, and the timestamp offset of host device 104a.

At the start of the communal session, user devices 104b-104d may receive the start time for playing the media from synchronization system 102b. When the media playback starts, each user device 104b-104d may provide, to synchronization system 102b, a timestamp receipt of the start time of the media playback on the device and the frame identifier acknowledgment of the media fragment(s) received by the device. During the communal session, each user device 104b-104d may also provide the progress of the media playback on a predetermined basis, for example, as defined by business management system 102c, to synchronization system 102b. Synchronization system 102b may review and compare the locations in the media being played on user devices 104a-104d on a pre-determined basis. Synchronization system 102b may continuously determine that the media being played on user devices 104a-104d are synchronized within a pre-determined period, for example, a pre-determined number of milliseconds or second. Synchronization system 102b may dynamically adjust the pre-determined period to ensure the quality of the multimedia content. The pre-determined period may be defined by business management system 102c. Synchronization system 102b may also ensure that the media being played on user devices 104b-104d is not ahead of the media being played on host device 104a.

Each user devices 104a-104d may continuously send its timestamp receipts and/or the frame identifier acknowledgments for fragment(s) played on the device to synchronization system 102b. If the media being played on any of user devices 104a-104d falls behind a certain threshold, synchronization system 102b may provide signaling messages to user devices 104a-104d. The signaling messages may be defined by business management system 102c. Synchronization system 102b may make necessary adjustments in transmitting the media to user devices 104a-104d, for example, either by marginally slowing the media being played to one or more devices or by accelerating the media being played to one or more devices, until all of the devices are on the same frame. By making the necessary adjustments in transmitting the media to user devices 104a-104d, synchronization system 102b may ensure that the media is transmitted and played on all devices within acceptable tolerances.

If the host device rewinds the media being played on the host device, the time offset associated with the host device and/or frame number associated with the content is adjusted continuously until the host device stops rewinding the media and playing the media resumes. Similarly, if the host device fast forwards the media being played on the host device, the time offset and/or frame number is adjusted continuously until the host device stops fast forwarding the media and playing the media resumes. The rewind or fast forward offset is sent to synchronization system 102b for adjustments of the transmissions on the other devices in the communal session. If the host device pauses the media being played on the host device, is message is sent to synchronization system 102b and transmissions of the media is paused, such that a pause action on the host device pauses playing of the media on all user devices at the same time.

Figure 4:
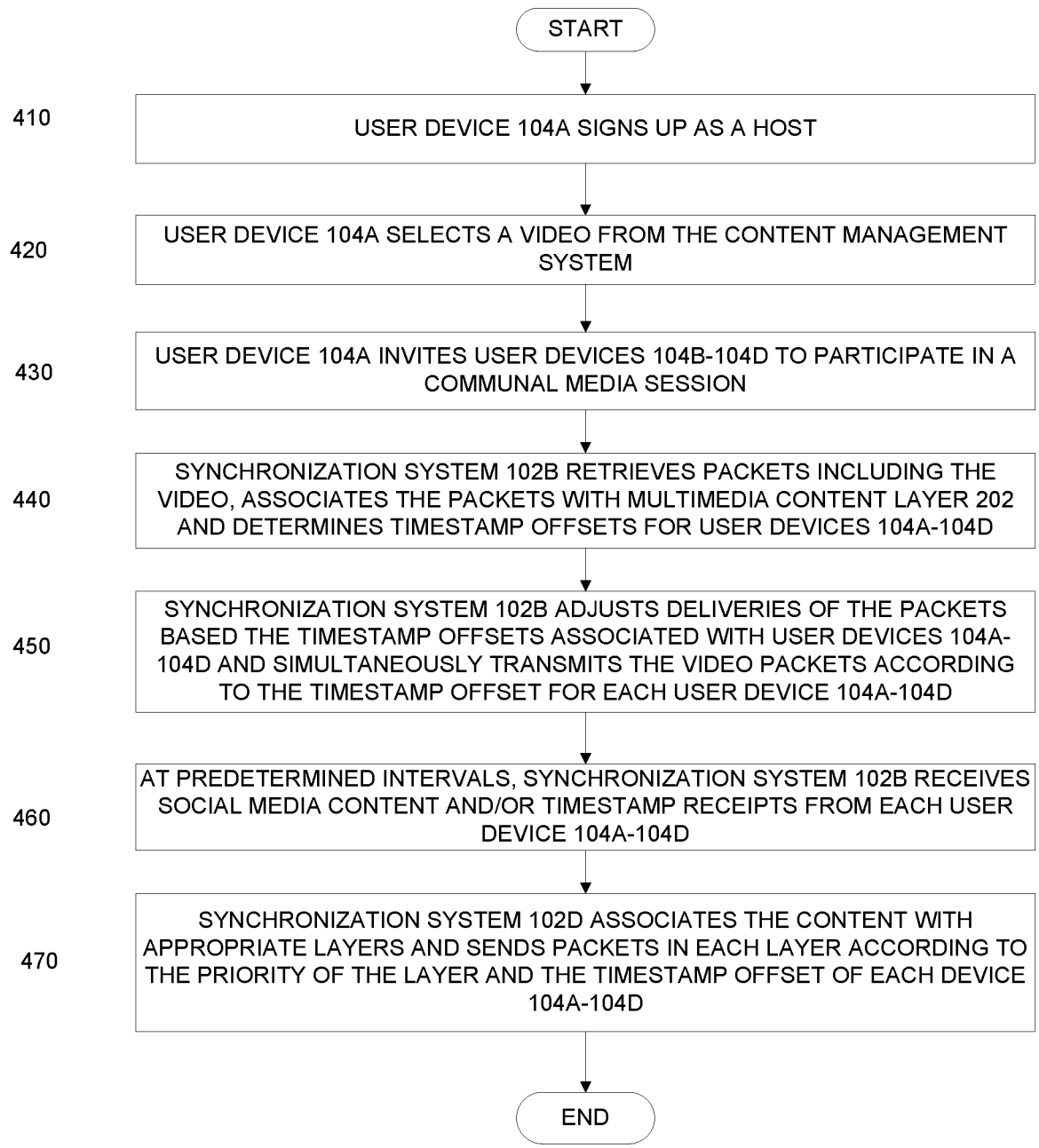
FIG. 4 is a flowchart of a method of sharing multimedia content in accordance with some embodiments.

FIG. 4 is a flowchart of a method of sharing multimedia content in accordance with some embodiments. At 410, if a user of one of the devices, for example, user device 104a, wants to participate in a communal media session with the users of user devices 104b-104d, the user of device 104a may sign up as a host/moderator in communal media system 100. At 420, the user of device 104a may select a video from content management system 102a. At 430, the user of device 104a may select the users of devices 104b-104d from a contact library and send invitations to user devices 104b-104d. The invitations may invite users of devices 104b-104d to view the selected video at a predetermined viewing time. The predetermined viewing time may be a current time or a future time. The users of devices 104b-104d may accept or reject the invitations.

At 440, at the predetermined viewing time, synchronization system 102b may retrieve packets including the video, associate the packets with multimedia content layer 202 and determine timestamp offsets for user device 104a-104d. At 450, synchronization system 102b adjusts deliveries of the packets based the timestamp offsets associated with user devices 104a-104d and simultaneously transmits the video packets according to the timestamp offset for each user device 104a-104d. At 460, at pre-determined time intervals, synchronization system 102b may continuously receive social media content and/or timestamp receipts from each user device 104a-104d, wherein the timestamp receipts are for packets delivered to and sent from the user device. The packets sent from user devices 104a-104d may include video chats, texts, emojis, or other social media interactions on user devices 104a-104d. At 470, synchronization system 102b continues to associate each type of content (video stream, video chat, text and emojis) with an appropriate layer 200, adjusts simultaneous deliveries of the packets including the multimedia and social media content based on a priority associated with each layer 202 and the timestamp offset associated with user device 104a-104d. This allows all the user devices 104a-104d to receive the multimedia content, video chat, texting and emojis at the same time, wherein delivery of the multimedia content, video chat, texting and emojis is fully synchronized across all user devices 104a-104d.

Figure 5:
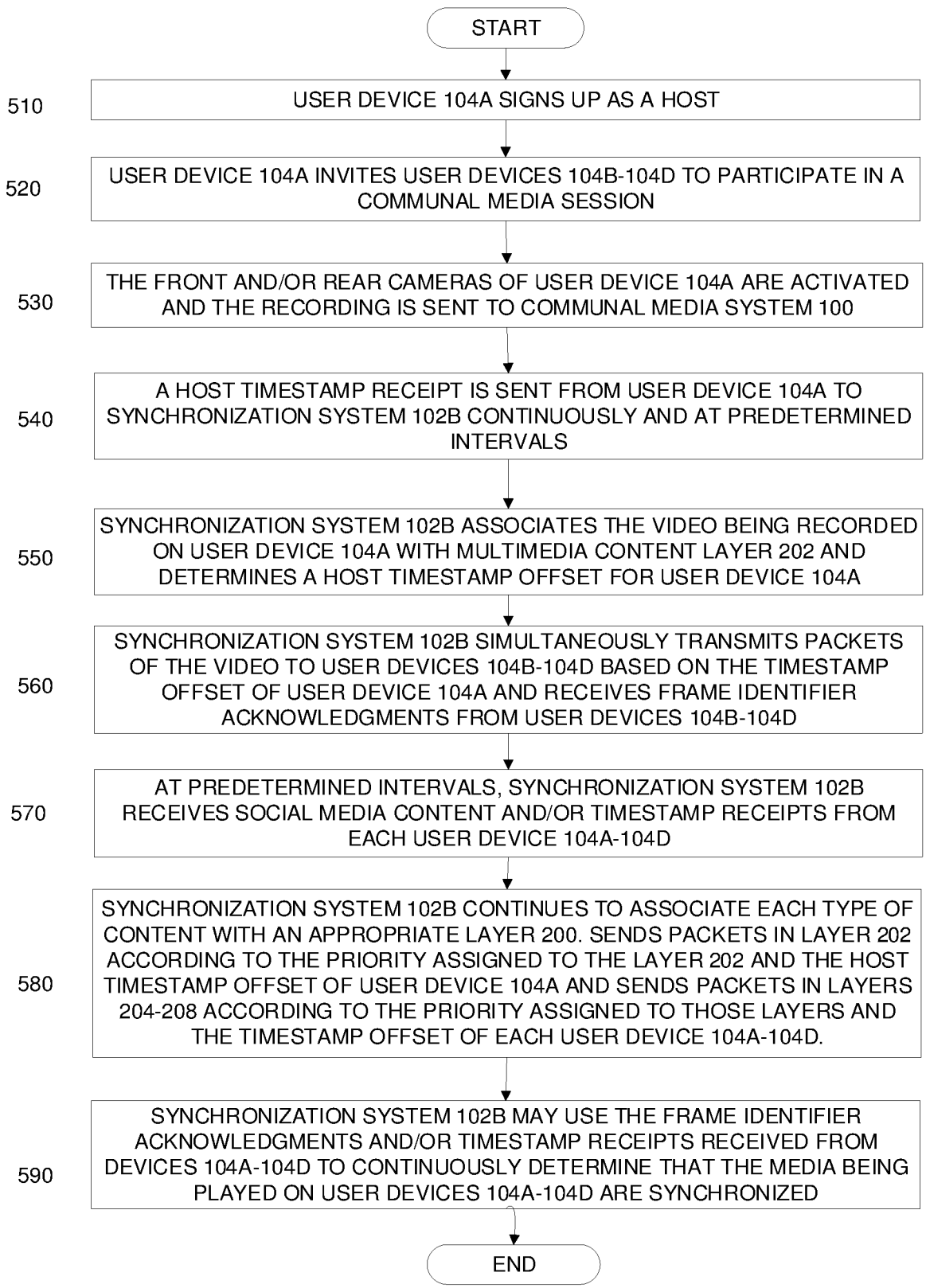
FIG. 5 is a flowchart of a method of sharing multimedia content generated on a user device in accordance with some embodiments.

FIG. 5 is a flowchart of a method of sharing multimedia content generated on a user device in accordance with some embodiments. At 510, the user of device 104a may sign up as a host/moderator in communal media system 100. At 520, the user of device 104a may select the users of devices 104b-104d from a contact library and send invitations to user devices 104b-104d. The invitations may invite users of devices 104b-104d to view a recording generated from the front and/or rear cameras of user device 104a at a predetermined viewing time. The predetermined viewing time may be a current time or a future time. The users of devices 104b-104d may accept or reject the invitations.

At 530, at the predetermined viewing time, the front and/or rear cameras of user device 104a are activated and the recording is sent to communal media system 100. In some embodiments, the recording may be saved as video fragments on content management system 102a and synchronization system 102b may deliver the video fragments from content management system 102a to user devices 104b-104d. At 540, host timestamp receipts are sent from user device 104a to synchronization system 102b continuously and at predetermined time intervals. At 550, synchronization system 102b associates the video being recorded on user device 104a with multimedia content layer 202 and determines a host timestamp offset for user device 104a. At 560, synchronization system 102b simultaneously transmits packets of the video to user device 104b-104d based on the host timestamp offset for user device 104a and receives frame identifier acknowledgements from user devices 104b-104d. At 570, at pre-determined time intervals, synchronization system 102b may continuously receive social media content and/or timestamp receipts from each user device 104a-104d for packets delivered to and sent from user devices 104a-104d. The packets sent from user devices 104a-104d may include social media content such as video chats, texts, emojis or other social media interactions on user devices 104a-104d. At 580, synchronization system 102b continues to associate each type of content (video stream, video chat, text and emojis) with an appropriate layer 200. sends packets in layer 202 according to the priority assigned to the layer 202 and the host timestamp offset of user device 104a and sends packets in layers 204-208 according to the priority assigned to those layers and the timestamp offset of each user device 104a-104d. At 590. synchronization system 102b may use the frame identifier acknowledgments and/or timestamp receipts received from devices 104a-104d to continuously determine that the media being played on user devices 104a-104d are synchronized. This allows all the user devices 104a-104d to receive the multimedia content being recorded on user device 104a at the same time, while sharing video chats, texts, and emojis, wherein delivery of the multimedia content, video chats, texts and emojis is fully synchronized across all user devices 104a-104d.

Figure 6:
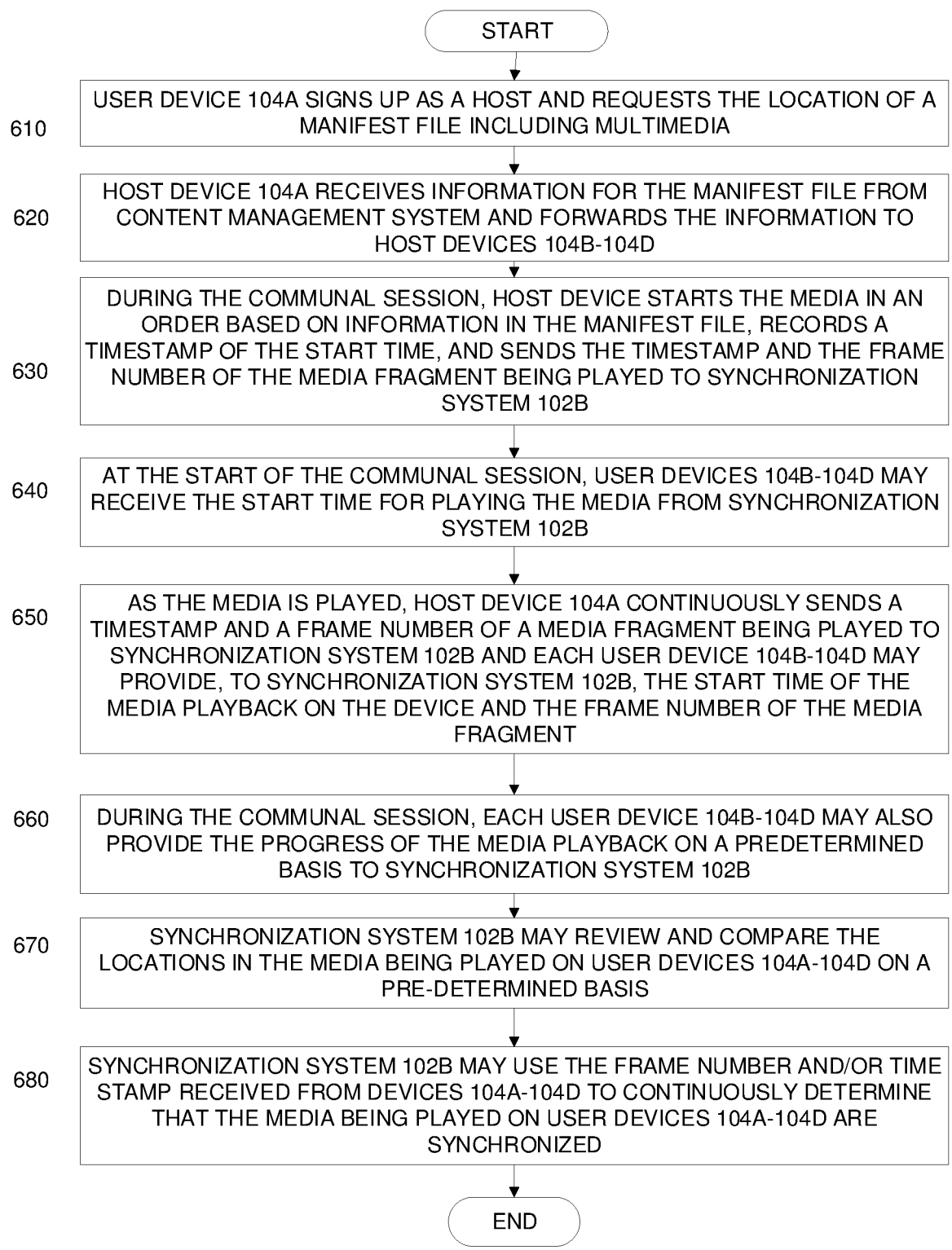
FIG. 6 is another flowchart of a method of sharing multimedia content in accordance with some embodiments.

FIG. 6 is another flowchart of a method of sharing multimedia content in accordance with some embodiments. At 610, user device 104a signs up as a host and requests the location of a manifest file including multimedia. At 620, host device 104a receives information for the manifest files from content management system 102a and forwards the information to devices 104b-104d. At 630, during the communal session, host device starts the media in an order based on information in the manifest file, records a timestamp receipt for the start time, and sends the timestamp receipt and the frame identifier acknowledgment of the media fragment being played to synchronization system 102b. At 640, at the start of the communal session, user devices 104b-104d may receive the start time for playing the media from synchronization system 102b and each user device 104b-104d may provide, to synchronization system 102b, the timestamp receipt of a start time of the media playback on the device.

At 650, as the media is played, host device 104a continuously sends timestamp receipts and/or frame identifier acknowledgments of media fragments being played to synchronization system 102b. At 660, during the communal session, each user device 104b-104d may also provide timestamp receipts and/or frame identifier acknowledgments on a predetermined basis to synchronization system 102b. At 670, synchronization system 102b may review and compare the locations in the media being played on user devices 104a-104d on a pre-determined basis. At 680, synchronization system 102b may use the frame identifier acknowledgments and/or timestamp receipts received from devices 104a-104d to continuously determine that the media being played on user devices 104a-104d are synchronized.

Figure 7:
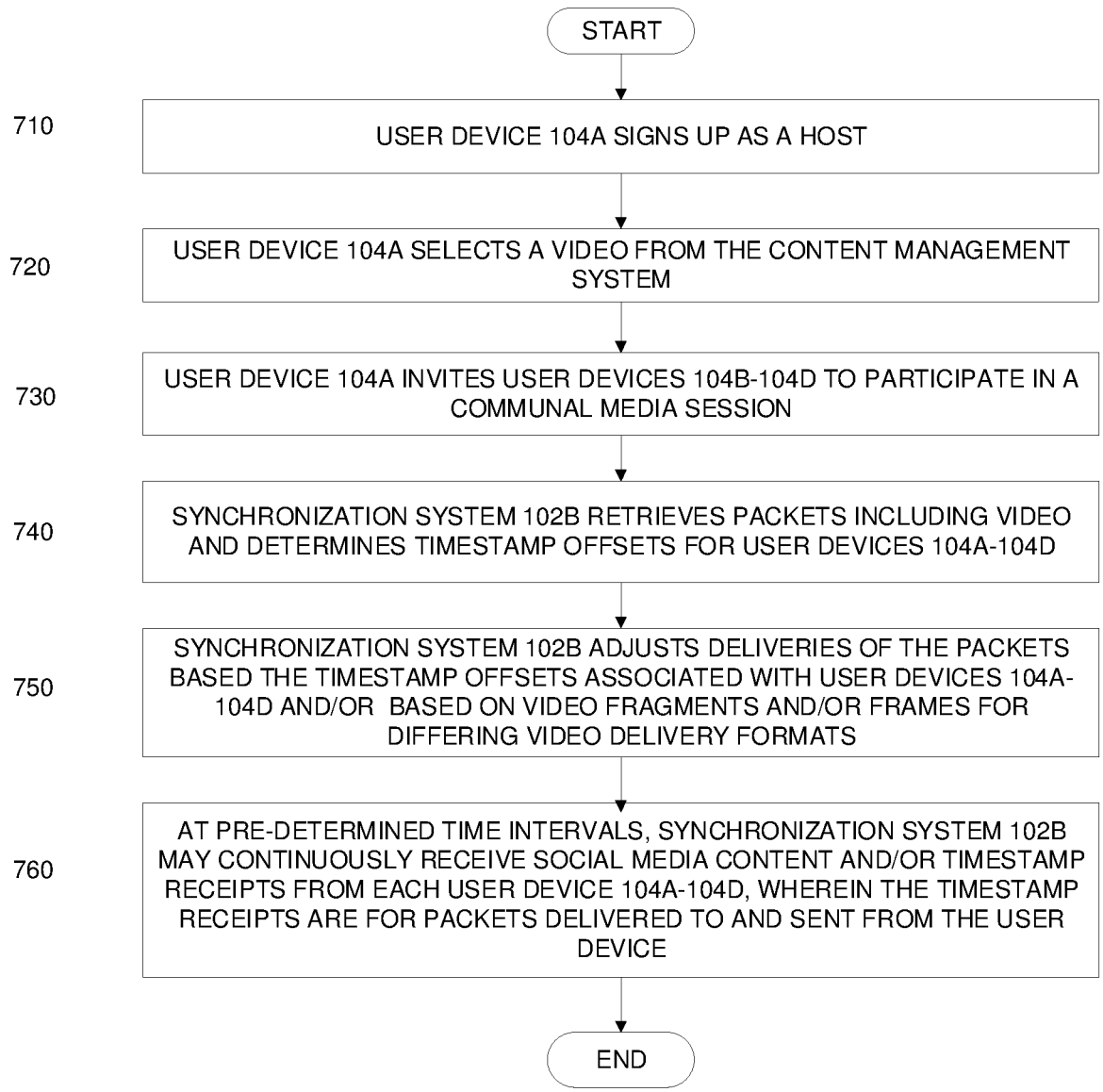
FIG. 7 is another flowchart of a method of sharing multimedia content in accordance with some embodiments.

FIG. 7 is a flowchart of another method of sharing multimedia content in accordance with some embodiments. At 710, if a user of one of the devices, for example, user device 104a, wants to participate in a communal media session with the users of user devices 104b-104d, the user of device 104a may sign up as a host/moderator in communal media system 100. At 720, the user of device 104a may select a video from content management system 102a. At 730, the user of device 104a may select the users of devices 104b-104d from a contact library and send invitations to view the selected video at a predetermined viewing time to user devices 104b-104d. The users of devices 104b-104d may accept or reject the invitations.

At 740, at the predetermined viewing time, synchronization system 102b may retrieve packets including the video, associate the packets with multimedia content layer 202 and determine timestamp offsets for user device 104a-104d. At 750, synchronization system 102b adjusts simultaneous deliveries of the packets based the timestamp offsets associated with user devices 104a-104d and/or based on video fragments and/or frames for differing video delivery formats including, for example, standard definition, high definition, 4K 5K, and other delivery formats. For example, synchronization system 102b may adjust deliveries of the packets based on video fragments and/or frames for differing video delivery formats by synchronizing the fragments and/or frames delivered to user device 104b-104d according to a predetermined (for example, lower) latency interval between user device 104a and user devices 104b-104d.

At 760, at pre-determined time intervals, synchronization system 102b may continuously receive social media content, timestamp receipts, and/or frame identifier acknowledgements from each user device 104a-104d, wherein the timestamp receipts are for packets delivered to and sent from the user device. The packets sent from user devices 104a-104d may include video chats, texts, emojis, or other social media interactions on user devices 104a-104d. This allows all the user devices 104a-104d to receive the multimedia content, video chat, texting and emojis at the same time, wherein delivery of the multimedia content, video chat, texting and emojis is fully synchronized based on video fragments and/or frames for differing video delivery formats across all user devices 104a-104d.

Figure 8:
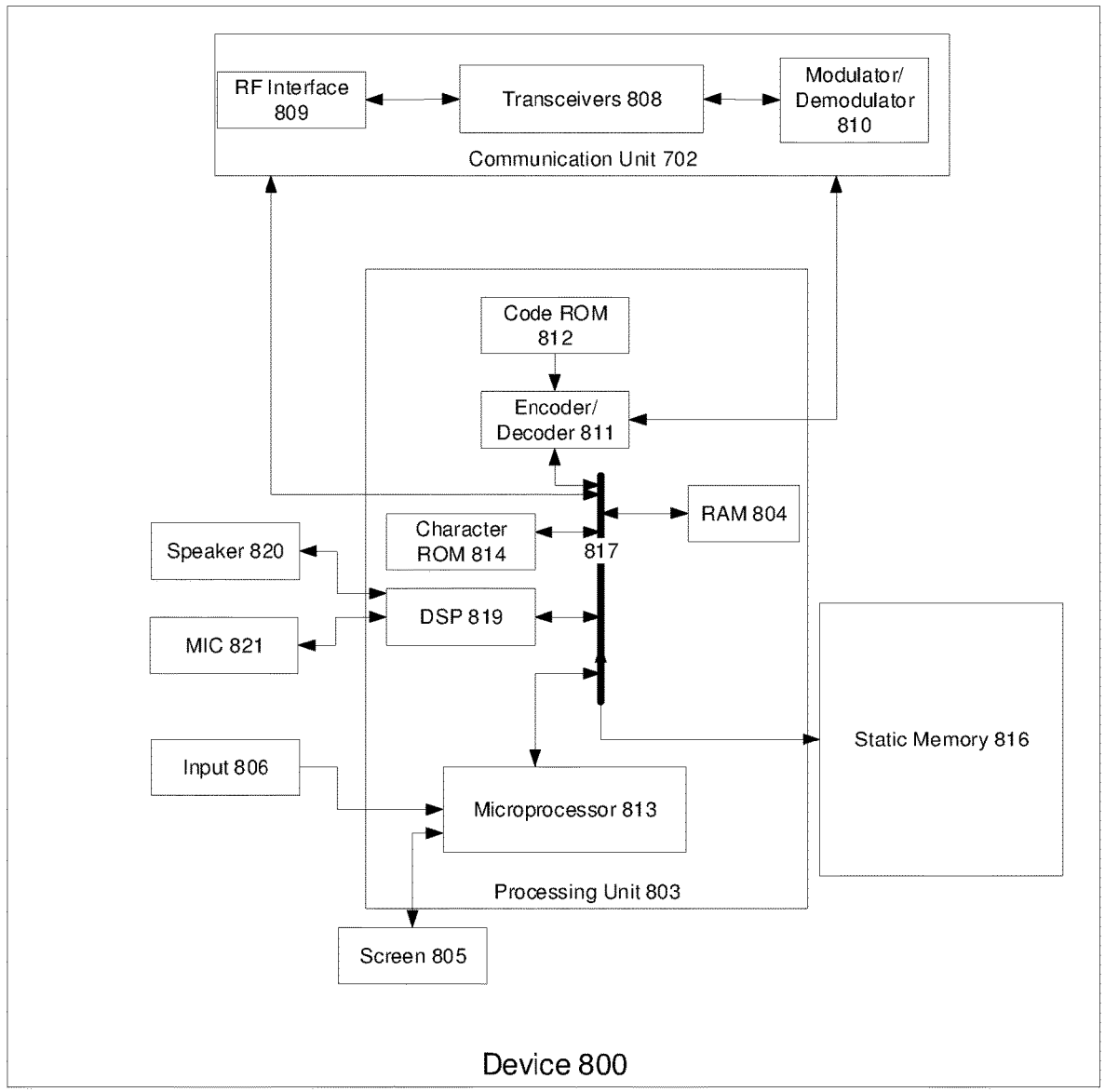
FIG. 8 is a block diagram of a user device used in accordance with some embodiments.

FIG. 8 is a block diagram of a user device 800, such as user device 104 of FIG. 1, used in accordance with some embodiments. User device 800 may include a communications unit 802 coupled to a common data and address bus 817 of a processor 803. Device 800 may also include an input unit (e.g., keypad, pointing device, etc.) 806, an output transducer unit (e.g., speaker) 820, an input transducer unit (e.g., a microphone) (MIC) 821, and a display screen 805, each coupled to be in communication with the processor 803.

The processor 803 may include, that is, implement, an encoder/decoder 811 with an associated code read-only memory (ROM) 812 for storing data for encoding and decoding voice, data, control, or other signals that may be transmitted or received by device 800. The processor 803 may further include one or more of a microprocessor 813 and digital signal processor (DSP) 819 coupled, by the common data and address bus 817, to the encoder/decoder 811 and to one or more memory devices, such as a ROM 814, a random access memory (RAM) 804, and a static or flash memory 816. One or more of ROM 814, RAM 804 and flash memory 816 may be included as part of processor 803 or may be separate from, and coupled to, the processor 803. The encoder/decoder 811 may be implemented by microprocessor 813 or DSP 819, or may be implemented by a separate component of the processor 803 and coupled to other components of the processor 803 via bus 818.

Communications unit 802 may include an RF interface 809 configurable to communicate with network components, and other user equipment within its communication range. Communications unit 802 may include one or more broadband and/or narrowband transceivers 808, such as an Long Term Evolution (LTE) or 5G transceiver, a WiMAX transceiver perhaps operating in accordance with an IEEE 802.16 standard, and/or other similar type of wireless transceiver configurable to communicate via a wireless network for infrastructure communications. Communications unit 802 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 810 that is coupled to the encoder/decoder 811.

The one or more memory devices 814, 816 may store code for decoding or encoding data such as control, request, or instruction messages, channel change messages, and/or data or voice messages that may be transmitted or received by device 800 and other programs and instructions that, when executed by the processor 803, provide for device 800 to perform the functions and operations described herein.

Figure 9:
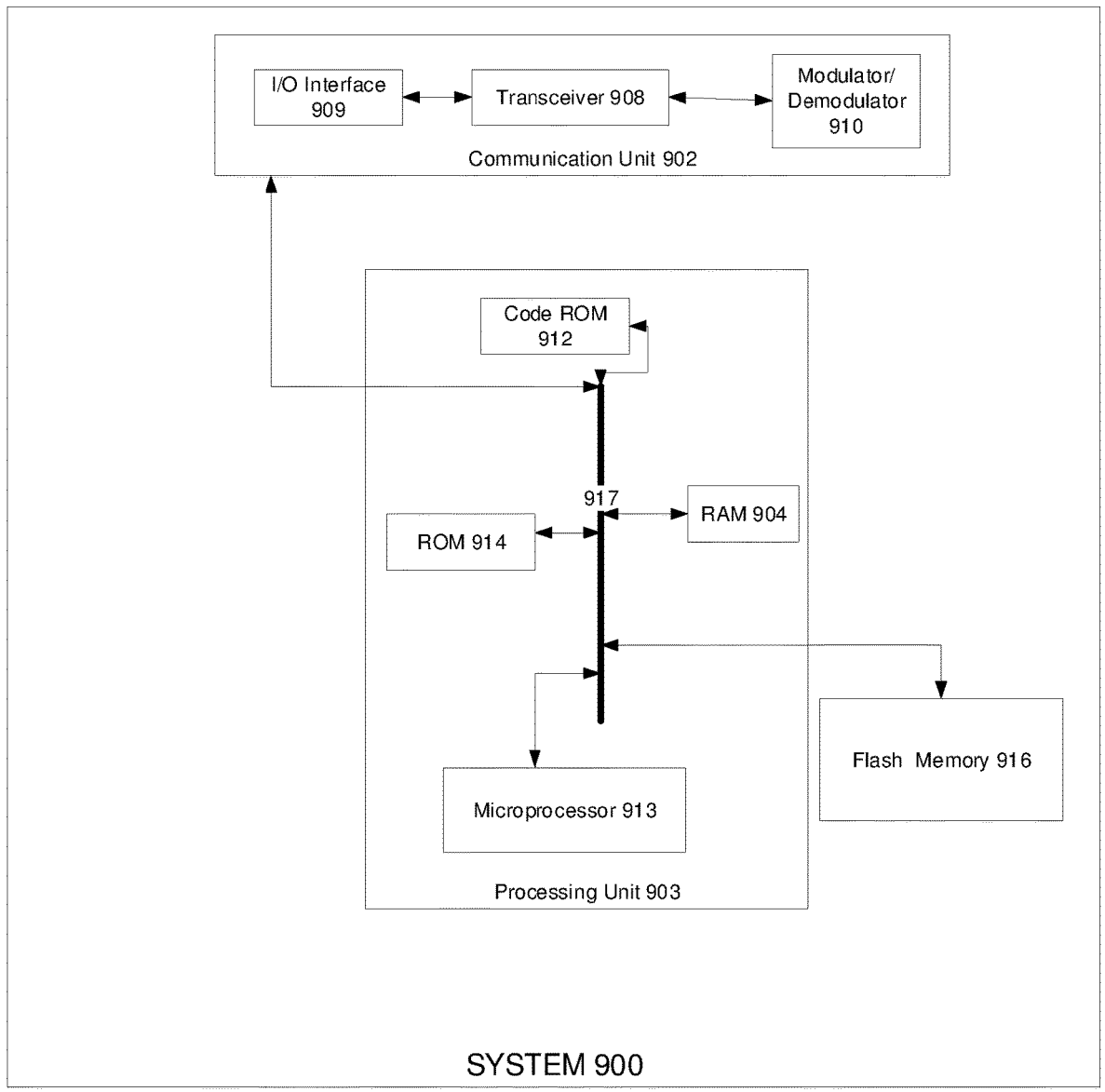
FIG. 9 is a block diagram of a system used in accordance with some embodiments.

FIG. 9 is a block diagram of a system 900, such as system 102 of FIG. 1, used in accordance with some embodiments. System 900, for example, may include a communications unit 902 coupled to a common data and address bus 917 of a processor 903. The processor 903 may include a code read-only memory (ROM) 912 for storing data for initializing system components of system 900. The processor 903 may further include a microprocessor 913 coupled, by the common data and address bus 917, to one or more memory devices, such as a read-only memory (ROM) 914, a random access memory (RAM) 904, and/or a static or flash memory 916. One or more of ROM 914, RAM 904 and flash memory 916 may be included as part of processor 903 or may be separate from, and coupled to, the processor 903.

Communications unit 902 may include a wired or wireless input/output I/O interface 909 configurable to communicate with network components and other user equipment within its communication range. Communications unit 902 may include one or more broadband and/or narrowband transceivers 908, such as a Long-Term Evolution (LTE) transceiver and/or other similar type of wireless transceiver configurable to communicate via a wireless network for infrastructure communications. Communications unit 902 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 910. The one or more memory devices 912, 914 and 916 are configured to store non-transitory computer-executable instructions to perform a set of functions such as described herein.

Communal media system 100 may be configured to record and store a communal media session for all participants in content management system 102 or on other cloud storage. Communal media system 100 may also be configured to retrieve the recording of the session for viewing at a predetermined time.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communal media system, comprising:
   a content management system comprising a memory to store multimedia content; and
   a synchronization system comprising a processor to:
      retrieve the multimedia content for delivery to a plurality of user devices and receive social media content generated by the plurality of user devices;
      separate the multimedia content and the social media content into a set of prioritized layers;
      transmit the multimedia content and the social media content to the plurality of user devices;
      continuously receive at least one of timestamp receipts and fragment identifier acknowledgements associated with receipt of the multimedia content from the plurality of user devices; and
      adjust simultaneous deliveries of the multimedia content and the social media content to the plurality of user devices, based on a priority associated with each layer and at least one of the timestamp receipts and the fragment identifier acknowledgements received from each of the plurality of user devices,
      wherein the multimedia content and the social media content are delivered to each of the plurality of user devices at a same time.

2. The communal media system of claim 1, wherein the synchronization system determines a timestamp offset for each of the plurality of user devices and the timestamp offset is based on a predetermined minimum network configuration.

3. The communal media system of claim 1, wherein the timestamp receipts include a timestamp of when a predefined number of packets is received by each of the plurality of user devices and another timestamp of when a predefined number of packets is sent from each of the plurality of user devices.

4. The communal media system of claim 1, wherein prioritized layers include a multimedia content layer, a video chat layer, a text layer, and an emojis layer.

5. The communal media system of claim 1, further comprising a business management system to perform at least one of user authorization and authentication, device registrations, entitlement checks, and digital rights management content encryption for licensed content stored on the content management system.

6. The communal media system of claim 1, further comprising a business management system to capture system configuration information from each of the plurality of user devices and determine if configuration on each user device meets a predetermined threshold, and
   wherein the business management system is to capture user login credentials from each of the plurality of user devices with a configuration at or above the predetermined threshold.

7. The communal media system of claim 1, wherein the synchronization system adjusts simultaneous deliveries of the multimedia content to the plurality of user devices based on at least one of video fragments and frames for differing video delivery formats, wherein the synchronization system synchronizes at least one of video fragments and frames delivered to the plurality of user devices according to a predetermined latency interval between the plurality of user devices.

8. The communal media system of claim 1, wherein one or more of the social media content, advertisement and recommendations is overlaid on delivered multimedia content.

9. The communal media system of claim 1, wherein the multimedia content includes video capture on at least one camera on one of the user devices.

10. A method for delivering multimedia content during a communal media session, comprising:
    at a communal media system, registering a plurality of user devices to participate in the communal media session;
    during the communal media session, retrieving, by a synchronization system, the multimedia content to be delivered to the plurality of user devices and receiving social media content generated by at least one of the plurality of user devices;
    separating, by the synchronization system, the multimedia content and the social media content into a set of prioritized layers;
    transmitting, by the synchronization system, the multimedia content and the social media content to the plurality of user devices;
    continuously receiving, by the synchronization system, at least one of timestamp receipts and fragment identifier acknowledgements associated with receipt of the multimedia content from the plurality of user devices; and
    adjusting, by the synchronization system, simultaneous deliveries of the multimedia content and the social media content to the plurality of user devices, based on a priority associated with each layer and at least one of the timestamp receipts and the fragment identifier acknowledgements received from each of the plurality of user devices,
    wherein the multimedia content and the social media content are delivered to each of the plurality of user devices at a same time.

11. The method of claim 10, further comprising storing the multimedia content on a content management system.

12. The method of claim 10, wherein the registering further comprises capturing, by a business management system, system configuration information from each of the plurality of user devices and determining if configuration on each user device meets a predetermined threshold.

13. The method of claim 10, wherein adjusting further comprises adjusting simultaneous deliveries of the multimedia content to the plurality of user devices based on at least one of video fragments and frames for differing video delivery formats, wherein the synchronization system synchronizes at least one of the video fragments and frames delivered to the plurality of user devices according to a predetermined latency interval between the plurality of user devices.

14. The method of claim 10, further comprising determining a timestamp offset for each of the plurality of user devices, wherein the timestamp offset is based on a predetermined minimum network configuration.

15. The method of claim 10, further comprising continuously receiving, by the synchronization system, a timestamp receipt from each of the plurality of user devices when a predefined number of packets is received by each of the plurality of user devices and when a predefined number of packets is sent from each of the plurality of user devices.

16. The method of claim 10, further comprising adjusting an interval for delivering or receiving timestamps, wherein the interval may be one of a predefined interval or a dynamic interval that is adjusted according to various speeds of heterogenous networks of the plurality of user devices.

17. The method of claim 10, further comprising overlaying one or more of the social media content, advertisement and recommendations on delivered multimedia content.

18. The method of claim 10, wherein the multimedia content includes video capture on at least one camera on one of the user devices.

19. A method for sharing multimedia content generated on a host user device in a communal media session, comprising:
    registering, at a communal media system, a plurality of user devices to participate in the communal media session, the plurality of user devices including the host user device and at least one non-host user device; and
    during the communal media session:
        retrieving, by a synchronization system, a recording from the host user device, wherein the recording includes multimedia content to be delivered to the at least one non-host user device;
        receiving, by the synchronization system, social media content generated by at least one of the plurality of user devices;
        separating, by the synchronization system, the multimedia content and the social media content into a set of prioritized layers;
        transmitting, by the synchronization system, the multimedia content to the at least one non-host user device based on a host timestamp offset associated with the host user device and transmitting the social media content among the plurality of user devices;
        continuously receiving, by the synchronization system, at least one of non-host user device timestamp receipts and non-host user device fragment identifier acknowledgements associated with receipt of the multimedia content from the at least one non-host user device; and
        adjusting, by the synchronization system, simultaneous deliveries of the multimedia content and the social media content to the plurality of user devices, based on a priority associated with each layer and at least one of the non-host user device timestamp receipts and the non-host user device fragment identifier acknowledgements,
    wherein the multimedia content and the social media content are delivered to each of the plurality of user devices at a same time.

20. The method of claim 19, wherein the multimedia content includes video capture on at least one or more cameras on the host user device.

* * * * *